United States Patent
Wissler et al.

[19]

[11] Patent Number: 6,051,897
[45] Date of Patent: Apr. 18, 2000

[54] SOLENOID ACTUATOR WITH POSITIONAL FEEDBACK

[75] Inventors: Thomas Wissler, Kirchheim, Germany; Richard S. Glogovski, Libertyville; Kevin C. Code, Midlothian, both of Ill.; Hans Schmotz, Grosshelfendorf, Germany

[73] Assignee: Synchro-Start Products, Inc., Niles, Ill.

[21] Appl. No.: 09/305,496

[22] Filed: May 5, 1999

[51] Int. Cl.⁷ .................................................. H02K 41/00
[52] U.S. Cl. ................................ 310/14; 310/12; 310/23; 310/30; 338/176
[58] Field of Search .................................. 310/12, 14, 15, 310/17, 23, 30, 35, 34; 338/176, 116; 188/173; 29/602.1

[56] References Cited

U.S. PATENT DOCUMENTS

| | | |
|---|---|---|
| 2,617,050 | 11/1952 | Weinfurt . |
| 3,260,870 | 7/1966 | Beach, Jr. et al. . |
| 3,433,983 | 3/1969 | Keistman et al. . |
| 3,531,666 | 9/1970 | Ford . |
| 3,883,839 | 5/1975 | Barrett et al. ............................ 338/116 |
| 4,479,107 | 10/1984 | Bleeke . |
| 4,557,355 | 12/1985 | Wilke et al. . |
| 4,579,146 | 4/1986 | Tsuru et al. . |
| 4,623,868 | 11/1986 | Pitcher . |
| 4,635,683 | 1/1987 | Nielsen . |
| 5,031,934 | 7/1991 | Soltis . |
| 5,072,206 | 12/1991 | Kozuka et al. ........................... 338/184 |
| 5,103,172 | 4/1992 | Stoll . |
| 5,224,410 | 7/1993 | Graichen et al. . |
| 5,252,938 | 10/1993 | Bishop . |
| 5,698,910 | 12/1997 | Bryant et al. . |
| 5,939,804 | 8/1999 | Nakao et al. .............................. 310/12 |
| 5,949,161 | 9/1999 | Nanba ....................................... 310/12 |
| 5,952,743 | 9/1999 | Sidey ......................................... 310/12 |
| 5,959,382 | 9/1999 | Dauwalter ................................. 310/12 |
| 5,965,963 | 10/1999 | Chitayat .................................... 310/12 |

*Primary Examiner*—Nestor Ramirez
*Assistant Examiner*—Saeed Ghahramani
*Attorney, Agent, or Firm*—Wallenstein & Wagner, Ltd.

[57] ABSTRACT

A solenoid is provided having a housing with a housing bore with a central axis. The housing bore opens at an opening in the housing at a first end. The solenoid further has an actuator extending from the opening, and which is sized to movably slide within the housing bore and within the opening along the central axis. A biasing member is provided in the solenoid for cooperating with the actuator and for biasing the actuator in a direction along the central axis. The solenoid also has an indicator positioned within the housing. The indicator cooperates with the actuator for relative movement therewith, and has an indicator path. An indication receiver is positioned within the housing, and located adjacent the indicator and the indicator path, for generating a signal that is representative of the position of the indicator and the position of the actuator. A method of manufacturing the solenoid is also provided, and includes the step of aligning the indication receiver within a recess in the housing. The method also includes the steps of temporarily holding the indication receiver in place with positioning means, calibrating a signal that is representative of the position of the actuator with the actual position of the actuator, and permanently locking the indication receiver in place with locking means.

36 Claims, 8 Drawing Sheets

SOLENOID ACTUATOR WITH POSITIONAL FEEDBACK

DESCRIPTION

1. Technical Field

The present invention relates generally to solenoid assemblies, and more particularly, to a solenoid assembly having positional feedback to determine the position of a solenoid actuator relative to a solenoid housing.

2. Background of the Invention

Solenoid devices generally consist of a housing having a bore therein. A tube, or liner, lies within the bore and is sized to receive a actuator. The actuator is attached to a plunger. The bore, and hence the tube, is either partially or completely surrounded by coils. Electrical excitation of the coils moves the plunger, and thus the actuator, in one direction, while a spring is used to bias the plunger in the other direction or back to a neutral position.

One electromagnetic actuator has been provided in the past as disclosed in U.S. Pat. No. 3,433,983. This electromagnetic actuator has a feedback potentiometer that is connected to a piston and provides a signal indicating the actual position of the piston in any instance during the piston stroke to a closed loop servo system associated computing circuitry. However, this feedback potentiometer is located outside the piston housing which adds to the cost of production of the overall apparatus due to an increased number of parts and other factors.

A potentiometric linear position sensor has also been provided in the past, as disclosed in U.S. Pat. No. 4,479,107. This patent discloses a position sensor having a resistive material disposed on a Kapton film, with a conductive material screen printed on the resistive material, all within a position sensor housing.

One additional actuator with position sensor is disclosed in U.S. Pat. No. 5,698,910 (Bryant et al.). This actuator includes an electrically conductive sense coil located adjacent one end of the actuator core, to indicate the position of the core, based on the change of the electrical property of the sense coil when the core moves.

The present invention is designed to solve these and other problems.

SUMMARY OF THE INVENTION

The present invention is a solenoid which includes associated features to provide position feedback sensing. The solenoid has a housing with a housing bore having a central axis. The housing bore opens at an opening in the housing at a first end. The solenoid further has an actuator extending from the opening, and which is sized to movably slide within the housing bore and within the opening along the central axis. A biasing member is provided in the solenoid for cooperating with the actuator and for biasing the actuator in a direction along the central axis. The solenoid also has a plunger having a collar. The solenoid also has coils surrounding the central axis. When current passes through the coils, the plunger is directly affected and moves in a direction along the central axis. The solenoid also has an indicator positioned within the housing. The indicator has an indicator path, and cooperates with the actuator through the collar for relative movement with the actuator. An indication receiver is positioned within the housing, and located adjacent the indicator and the indicator path, for generating a signal that is representative of the position of the indicator and the position of the actuator.

A method of manufacturing the solenoid is also provided, and includes the step of aligning the indication receiver within a recess in the housing. The method also includes the steps of temporarily holding the indication receiver in place with positioning means, calibrating a signal that is representative of the position of the actuator with the actual position of the actuator, and permanently locking the indication receiver in place with locking means.

Other features and advantages of the present invention will become apparent from the drawings and remaining specification below.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
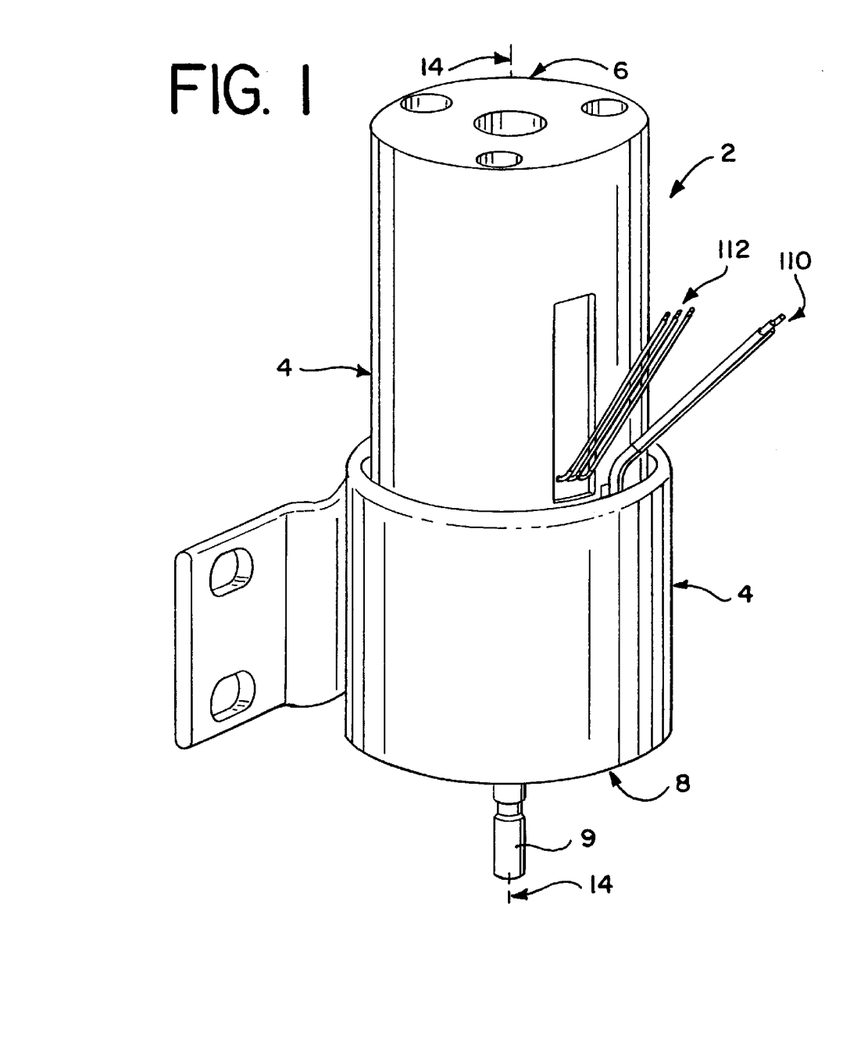
FIG. 1 is a perspective view of exterior of one embodiment of the solenoid of the present invention.
Figure 2:
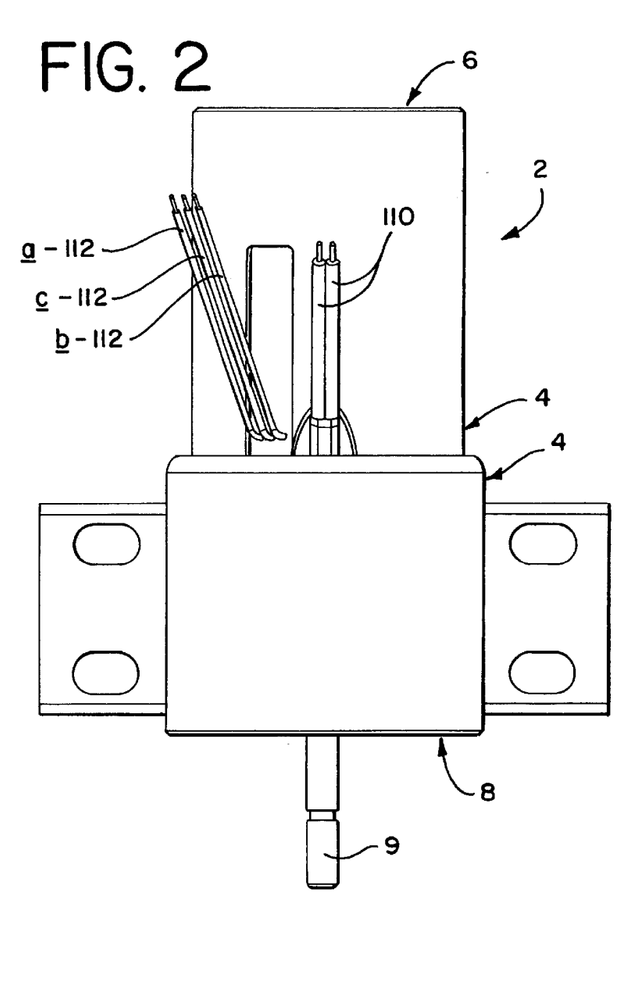
FIG. 2 is a front view of the solenoid of the present invention depicted in FIG. 1.
Figures 3, 4:
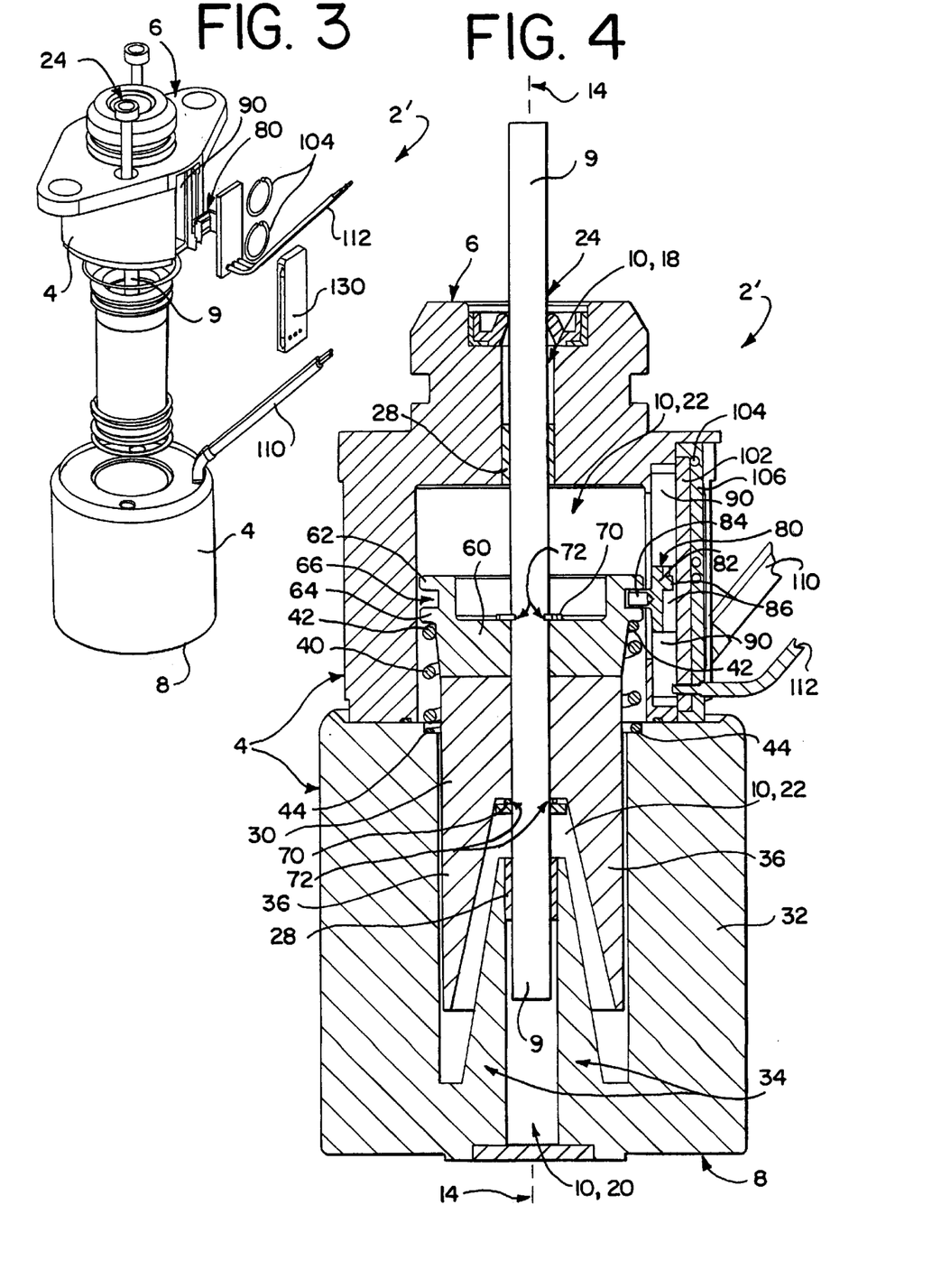
FIG. 3 is an exploded perspective view of another embodiment of the solenoid of the present invention.
FIG. 4 is a cross-sectional side view of the solenoid of the present invention depicted in FIG. 3.
Figure 5:
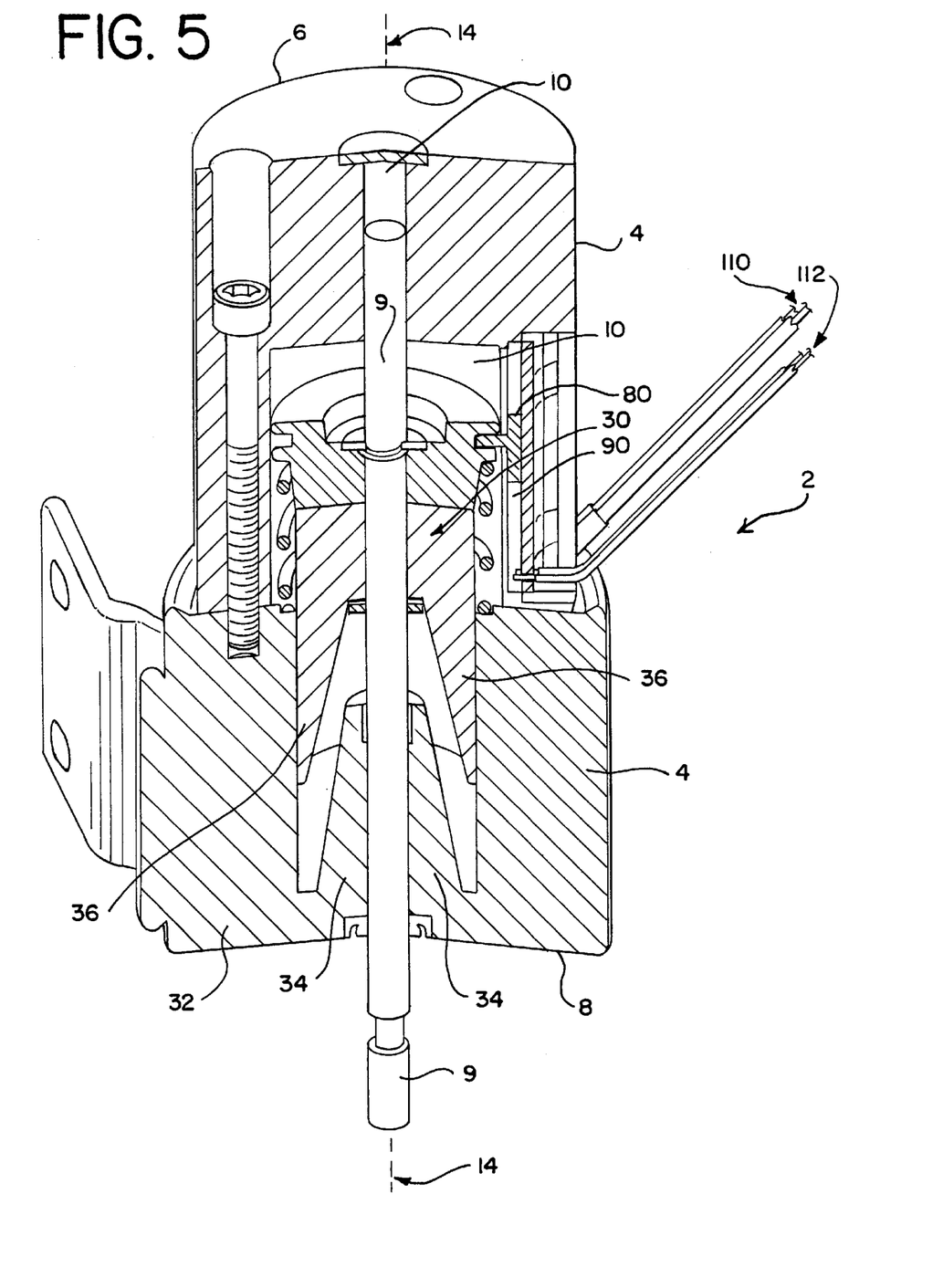
FIG. 5 is a cut-away perspective view of solenoid of the present invention depicted in FIG. 1.
Figure 6:
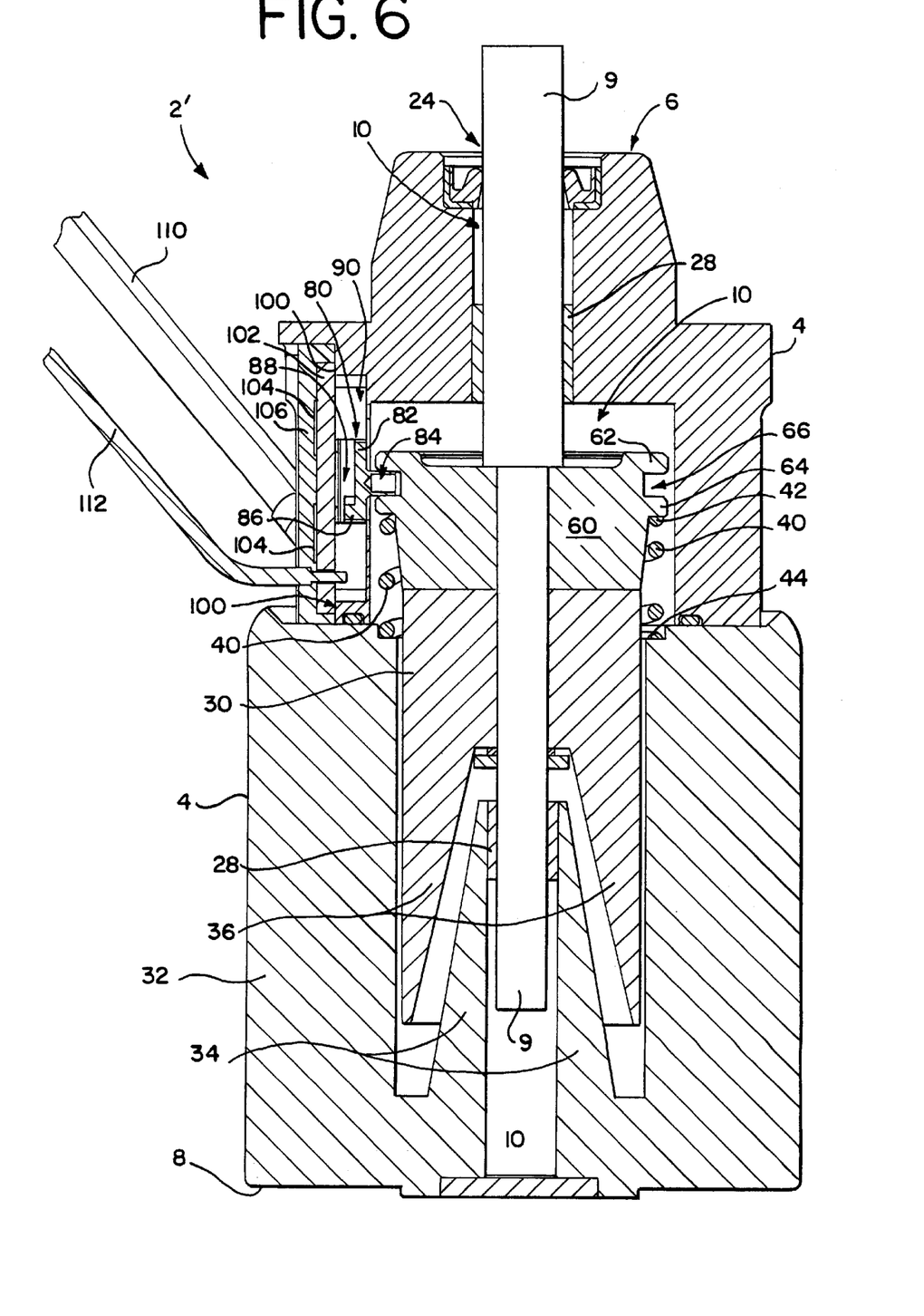
FIG. 6 is a reverse cross-sectional view of the solenoid of the present invention depicted in FIG. 4.

A positional electric solenoid 2, 2' with integral position feedback as shown in the attached figures. Referring to FIGS. 1, 2, and 5, one embodiment of the solenoid 2 is shown. The solenoid has a housing 4 with a first or upper end 6 and a second or lower end 8. The solenoid also includes an actuator 9, as will be more fully described below. In the first embodiment, the actuator 9 extends from a housing 4 at the second end 8 of the housing 4. FIGS. 3, 4, and 6 show a second embodiment of a solenoid 2' of the present invention with one significant difference from the first embodiment being that the actuator 9 extends from the first end 6 of the housing 4 in the second embodiment. Both of these, and other, embodiments will be described in further detail below.

In the embodiments in FIGS. 1, 2, 3, 4, 5, and 6, the housing 4 has a housing bore 10 with a central axis 14. The central axis 14 extends along a line which runs through center of the housing bore 10. The housing bore 10 has a first end bore portion 18, a second end bore portion 20, and a central bore portion 22. In the first embodiment of the solenoid 2, the first end bore portion 18 opens at an opening 24 in the housing 4 at the first end 6 of the housing 4. For these two embodiments, the actuator 9 is sized to movably slide within the housing bore 10, along the central axis 14, within tubular bushings 28 mounted within the housing bore 10. A plunger 30 is provided within the central bore portion 22, and is connected to the actuator 9. The plunger 30 axial moves with the actuator 9 within the housing bore 10. As will more fully described below, the plunger 30 and actuator 9 can tend to slightly rotate.

The solenoid 2, 2' also has an induction creating portion 32 within the housing 4 toward the second end 8 of the housing 4. This induction creating portion 32 typically is made from a coil winding (not shown) through which current is introduced. The coil winding is attached to leads 110 which provide the current for the solenoid 2, 2' actuation. As is easily understood, depending on the direction of current through the coil winding, the induction creating portion 32 will cause the plunger 30 and actuator 9 to move through the bore 10 along the central axis 14 either toward the first end 6 or second end 8 of the housing 4. The induction creating portion 32 has a cylindrical shape which is concentric with the central axis 14 of the housing 4. The induction creating portion 32 shown in the figures has an upwardly conical region 34

As with typical plungers for solenoids, the plunger 30 is manufactured in a manner, including design and choice of materials which cause the plunger to be affected by the induction created by the solenoid coil windings. Thus, the plunger 30 can also be considered as an induction affected portion. The induction affected portion 30 shown in the figures has a downwardly conical region 36 which generally matches with the upwardly conical region 34 of the induction creating portion 32.

Figure 15:
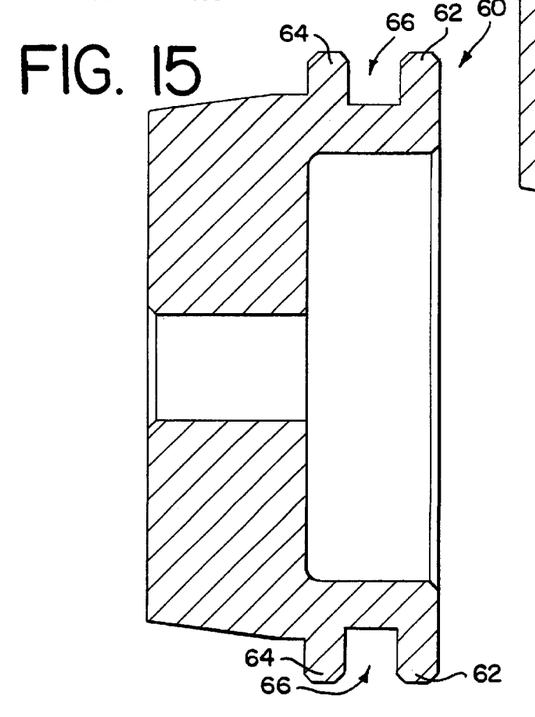
FIG. 15 is a cross-sectional side view of one collar of the solenoid of the present invention.
Figure 16:
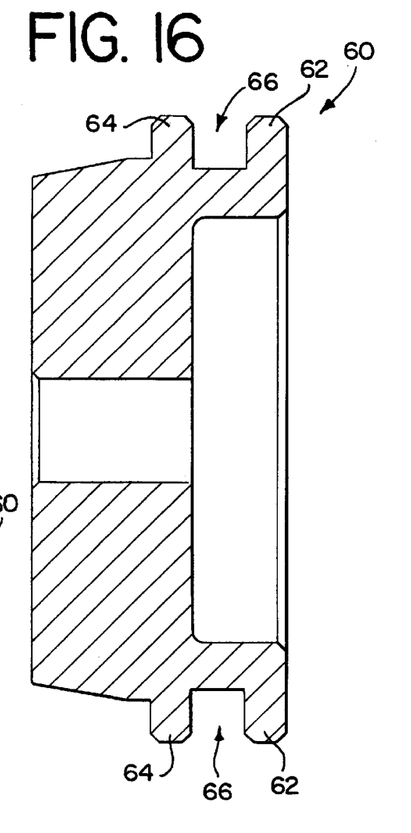
FIG. 16 is a cross-sectional side view of another collar of the solenoid of the present invention.

The solenoid 2, 2' also has a biasing member 40. The biasing member 40 shown in the figures is a spring. The spring 40 has a first end 42 and a second end 44. The first end 42 of the spring 40 is disposed adjacent to a collar 60 and engages with the collar 60. Various different collars 60 can be used with the present invention, as are depicted in 15 and 16. The second end 44 of the spring 40 is disposed adjacent to and engages with the induction creating portion 32 The biasing member or spring 40 cooperates with and biases the collar 60 (a part of the plunger 30) and the plunger 16 along with the actuator 9 to a neutral position, as shown in the figures. As indicated above, when the coil windings encircling at least a portion of the plunger 30 are provided electrical current, the plunger 30 is forced in a direction along the central axis 14, depending on the direction of the current. The plunger 30, and its collar 60, is attached to the actuator 9 with rings 70 that engage notches 72 in the actuator 9, for movement of the plunger 30 (and collar 60) with the actuator 9. The collar 60 has an upper lip 62 and a lower lip 64 which form a groove 66. The groove 66 can be continuous, and is shown in that manner in the figures based on the upper and lower lips 62, 64 also being continuous. However, the groove 66 can also be formed from non-continuous upper and lower lips 62, 64 or notches as one of ordinary skill in the art would understand from this specification. The groove 66 creates a groove plane which is generally perpendicular to the central axis 14 in the figures. The biasing member 40 contacts the lower lip 64 of the collar 60 for biasing the collar 60, the plunger 30, and the actuator 9 in a direction along the central axis 14.

The solenoid 2, 2' also has a position feedback reference or indicator 80. The indicator 80, in conjunction with other elements, acts as a potentiometer. The indicator 80 has a main portion 82, a protrusion 84 extending from the main portion 82, and an arm 86 extending from the main portion 82 in a direction generally opposed to direction of the protrusion 84. The arm 86 includes a wiper 88 which extends further in the direction generally opposed to the direction of the protrusion 84. The indicator 80 is moveably fitted with the collar 60 for movement with the collar 60. In particular, the protrusion 84 of the indicator 80 fits into the groove 66 of the collar 60 between the upper and lower lips 62, 64 of the collar 60. When the collar 60 moves in response to the coil windings being energized, the indicator 80 moves with collar 60 through this fitting. As mentioned above, when the coil windings are energized the plunger 30 and collar 60 can tend to rotate around the central axis 14 in addition to the movement along the central axis. When this occurs, the protrusion 84 of the indicator 80 can slide within the groove 66, which prevents any wear which would otherwise occur from a more rigid connection.

With additional reference to FIGS. 7–13, the housing 4 of the solenoid 2, 2' also has a channel or recess 90, within the first end 6 of the housing 4. The channel 90 includes a first channel or recessed region 92 adjacent the central region of 22 of the bore 10, and a second channel or recessed region 94 adjacent the first channel region 92 and adjacent the exterior of the housing 4. The first channel region 92 has a channel length which creates an indicator or indication path, which are both generally parallel to the central axis 14. The housing 4 also has an aperture along at least a part of the channel length between the first channel region 92 and the central bore 22. The second channel region 94 also has a channel length. The first channel region 92 and the second channel region 94 each also have a channel width. The channel length and width of the second channel region 94 are each slightly greater than the channel length and width of the first channel region 92, respectively. This slightly greater channel length and width of the second channel region 94 creates an abutment 100.

The solenoid 2, 2' also has an indication receiver 102 located adjacent the indicator 80 and the indicator path for generating a signal that is representative of the position of the indicator 80 and the position of the actuator 9. In particular, the indicator 80 is positioned within the first channel region 92 to slide along the length of the first channel region 92, and along the indicator path, when the collar 60 moves along the central axis 14. The protrusion 84 of the indicator 80 protrudes through the aperture 96 of the channel 90 and through to the central region 22 of the bore 10. As described above, the protrusion 84 is fitted in the groove 66 of the collar 60 for movement with the collar 60, and thus movement with the actuator 9. The indication receiver 102 is positioned within the second channel region 94. The indication receiver 102 has edges which abut the abutment 100 of the second channel region 102 when the indication receiver 102 is inserted into the second channel region 94. As will be described in more detail below, at least one positioner 104 (two of them are shown in the some of the figures) is used temporarily fix the indication receiver 102 in place, abutting the abutment 100. The positioner 104 can be a ring, a clamp, a clip or some other mechanism which temporarily holds the indication receiver in place. After the position of the indication receiver 102 is calibrated with the position of the actuator 9, or position of an instrument/other mechanism to which the actuator 9 is connected, a locking material 106 is placed within the second channel region 94. The locking material 106 surrounds the backside of the indication receiver 102 and contacts the abutment 100, for permanently fixing or locking the indication receiver 102 in place.

The indicator 80 has a wiper 88 that is a part of the arm 86 extending from the main portion 82. The wiper 88 contacts the indication receiver 102 and causes a signal that is representative of the position of the actuator 9 to be generated. As mentioned above, the indicator 80 has a main portion 82 which is moves within the first channel region 92 along the indicator path. The indication receiver 102 can be a resistance strip to obtain a reference signal designating the position of actuator 9. Position wires 112 are connected to the indication receiver 102 for carrying the signal that is representative of the position of the indicator 80 and the position of the actuator 9. Based on the actual value of the reference signal and the desired value of the reference signal, which can be measured through the 112 position wires, the amount of current directed through the coils of the solenoid can be controlled to obtain the desired position of the actuator 9.

Figure 7:
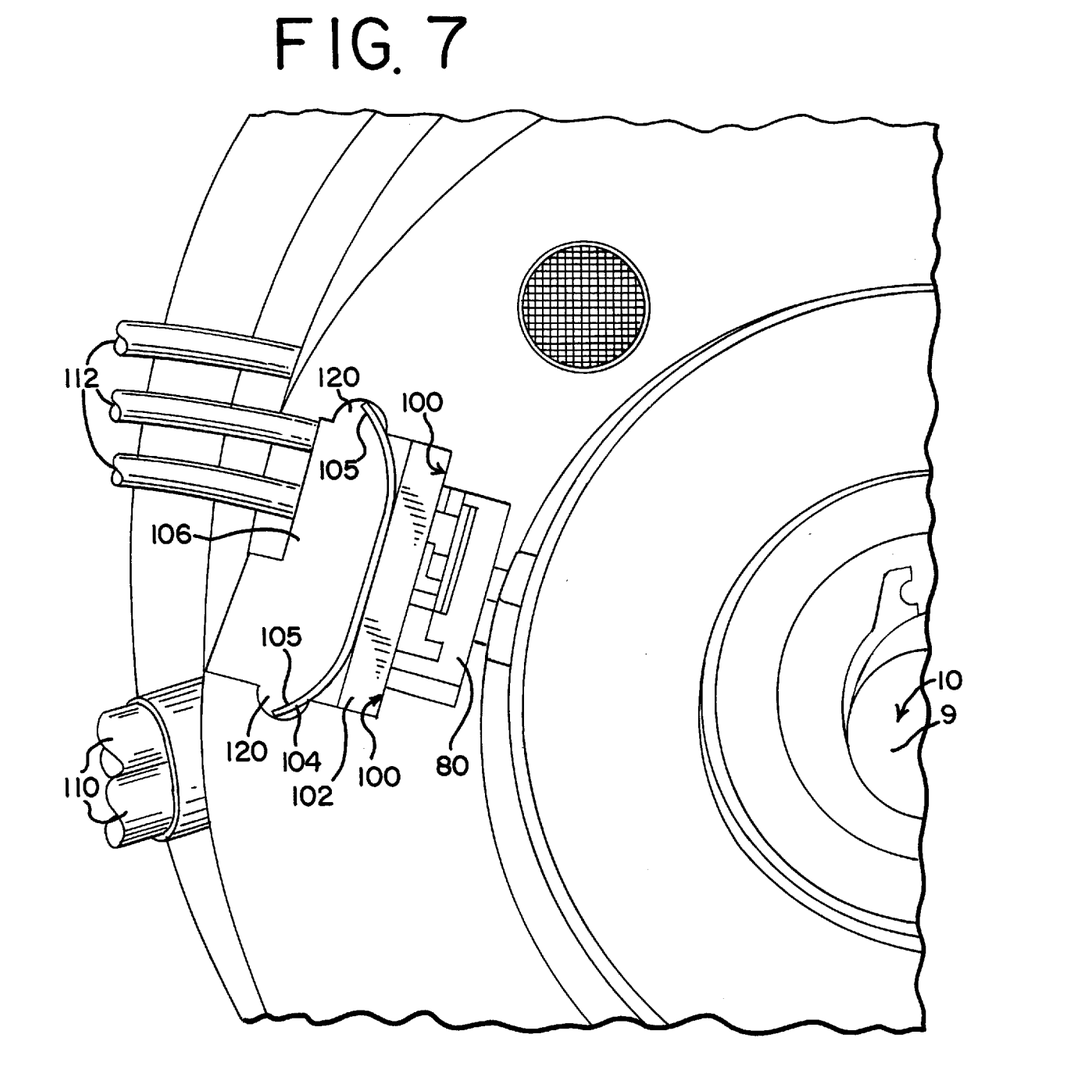
FIG. 7 is a top cut-away view of the positional sensor portion of the solenoid of the present invention.
Figure 8:
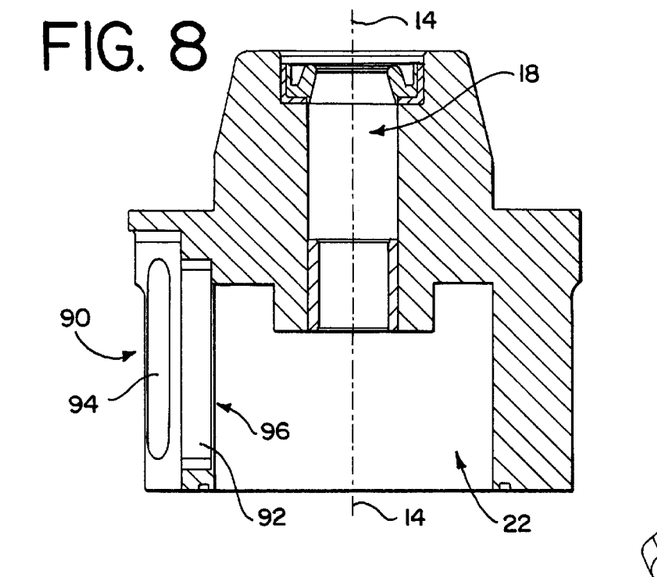
FIG. 8 is a cross-sectional side view of a portion of one housing of the solenoid of the present invention.
Figure 9:
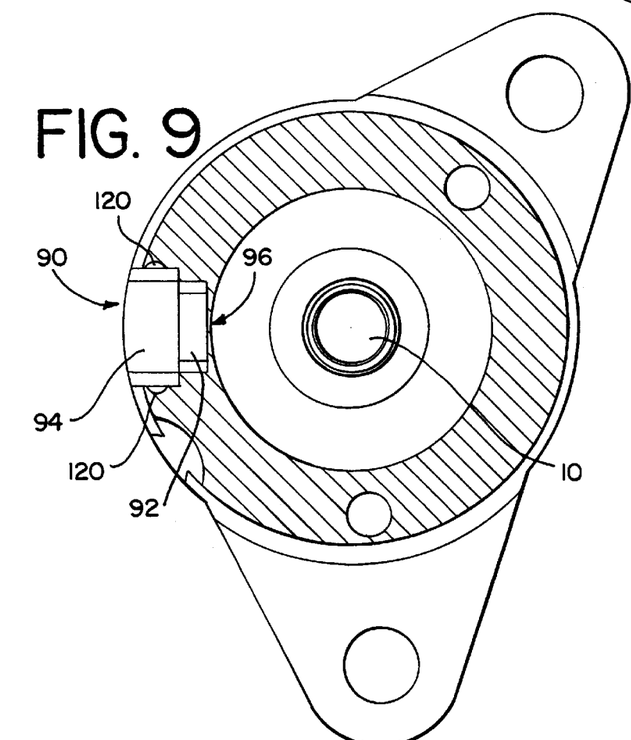
FIG. 9 is a cross-sectional top view of the portion of the housing of the solenoid of the present invention depicted in FIG. 8.
Figure 10:
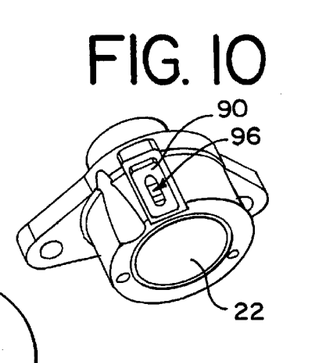
FIG. 10 is a perspective view of the portion of the housing of the solenoid of the present invention depicted in FIG. 8.
Figures 11, 12, 13:
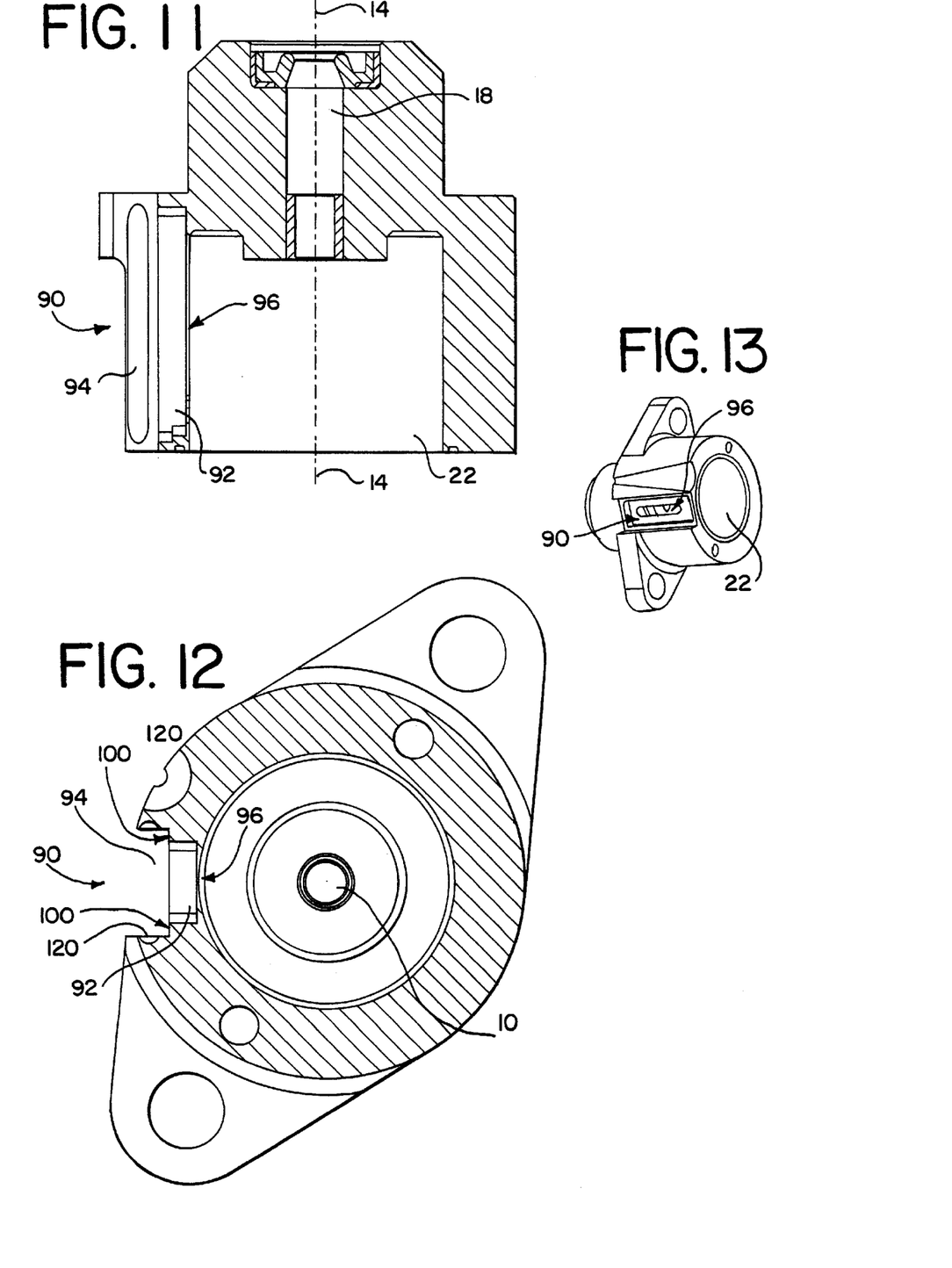
FIG. 11 is a cross-sectional side view of a portion of another housing of the solenoid of the present invention.
FIG. 12 is a cross-sectional top view of the portion of the housing of the solenoid of the present invention depicted in FIG. 11.
FIG. 13 is a perspective view of the portion of the housing of the solenoid of the present invention depicted in FIG. 11.

The present invention also includes a method of manufacturing the solenoid 2, 2'. The method is directed to the above described solenoid which has an actuator 9, an indicator 80 having an indicator path and being operatively connected to the actuator 9 for movement therewith. The solenoid 2, 2' also has an indication receiver 102 located adjacent the indicator and the indicator path for generating a signal that is representative of the position of the position of the actuator 9. The method includes aligning the indication receiver or strip 102 within the recess 90, and temporarily holding the indication receiver 102 in place with the positioner 104. As mentioned above, the positioner 104 can be a ring, a clip, a clamp, or some other device which keeps the indication receiver 102 in place, but which also allows the indication receiver to be moved for calibration. Within the housing 4, the recess 90 also has notches 120 which can be used in conjunction with the positioner 104 to hold the indication receiver 102 in place. In particular, FIG. 7 depicts the positioner 104 having ends 105 which are bent toward the exterior of the housing and into the notches 120. This bending of the positioner 104 shown into the notches 120 places pressure on the indication receiver 102 by the positioner 104. FIG. 3 also shows the positioners 104 before insertion.

As briefly mentioned above, the method also includes calibrating the signal, provided on the position wires 112, that is representative of the position of the actuator 9 with the actual position of the actuator 9. During calibration, a determination is made as to whether the indication receiver 102 needs to be repositioned. In order to more easily and quickly calibrate the signal, the positioner 104 does not need to be removed to reposition the indication receiver 102, and the positioner 104 does not place too much pressure on the indication receiver 102 so as to prevent the indication receiver 102 from sliding beneath the positioner 104.

Once the calibration is completed, the indication receiver 102 is permanently locked in place with a locking material 106. This is performed by filling the recess 90 with a liquid compound which hardens after filling. Several compounds or filler materials can be used, as one of ordinary skill in the art would understand. The material 106 will then permanently lock the indication receiver in place.

Figure 14:
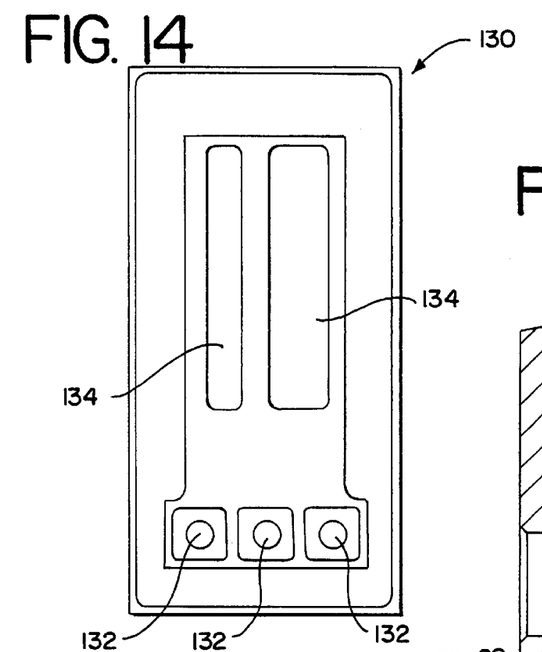
FIG. 14 is a front view of a cover plate of the housing of the solenoid of the present invention.

With additional reference to FIG. 14, a cover 130 is used to cover the recess 90. The cover 130 includes holes 132 for receiving the position wires 112, which are attached to the indication receiver 102. The position wires 112 are connected to devices and apparatus (not shown) which are used for calibrating and determining the position of the actuator 9, as would be understood with reference to this specification and the knowledge of ordinary skill in the art. The cover 130 in FIG. 14 also has through passages through which the locking material 106 can be filled into the recess 90. In one additional alternative embodiment, the holes 132 could be instead connectors on one side of the cover 130 connect to the indication receiver 102, and on the other side are adapted to connect to wires.

While the specific embodiments have been illustrated and described, numerous modifications come to mind without significantly departing from the spirit of the invention and the scope of protection is only limited by the scope of the accompanying claims.

What is claimed is:

1. A solenoid comprising:
   a housing having a first end and a second end, the housing having a housing bore with a central axis, wherein the housing bore opens at an opening in the housing;
   an actuator sized to movably slide within the housing bore;
   a collar attached to the actuator for movement therewith;
   an indicator moveably fitted with the collar for movement with the collar, the indicator having an indicator path; and,
   an indication receiver located adjacent the indicator and the indicator path for generating a signal that is representative of the position of the actuator.

2. The solenoid of claim 1, wherein the indication path is generally parallel to the central axis.

3. The solenoid of claim 1, further comprising a biasing member cooperating with the collar for biasing the collar and the actuator in a direction along the central axis.

4. The solenoid of claim 1, further comprising:
   coils for accepting an electrical current and for creating an electrical field; and,
   a plunger, wherein the collar is part of the plunger, and wherein the plunger and collar are directly affected by the electrical current passing through the coils.

5. The solenoid of claim 1, wherein the collar has a lower lip.

6. The solenoid of claim 5, wherein the biasing member contacts the lower lip of the collar for biasing the collar and the actuator in a direction along the central axis.

7. The solenoid of claim 1, wherein the collar has a lower lip and an upper lip, and wherein the indicator is attached to the collar between the lower lip and the upper lip.

8. The solenoid of claim 7, wherein the lower lip and the upper lip form a groove, wherein the indicator fits within the groove, and wherein when the collar rotates about the central axis, the indicator slides within the groove.

9. The solenoid of claim 8, wherein the housing has a channel having a channel length that is generally parallel with the central axis and the indication path, the housing having an aperture along at least a part of the channel length between the channel and the housing bore.

10. The solenoid of claim 9, wherein the indicator has a main portion which is moveably attached to the housing within the channel, a protrusion extending from the main portion through the aperture into the housing bore and into the groove, and an arm extending from the main portion toward and contacting the indication receiver.

11. The solenoid of claim 1, wherein the indication receiver is mounted within the housing adjacent a channel within the housing, the channel allowing the indicator to move within the channel in response to movement of the actuator and collar.

12. The solenoid of claim 1, wherein the indicator contacts the indication receiver to generate a signal that is representative of the position of the indicator along the indicator path, and that is representative of the position of the actuator.

13. The solenoid of claim 8, wherein the groove creates a groove plane which is generally perpendicular to the central axis.

14. The solenoid of claim 1, wherein the biasing member has a first end and a second end, the first end disposed adjacent to collar and the second end disposed adjacent to an induction creating portion, the induction creating portion being disposed within the housing toward the second end of the housing, and the induction creating portion having a cylindrical shape around the central axis of the housing.

15. A solenoid comprising:
a housing having a housing bore with a central axis, the housing bore opening at an opening in the housing at a first end;
a actuator extending from the opening, and sized to movably slide within the housing bore;
an indicator positioned within the housing, the indicator cooperating with the actuator for relative movement therewith, the indicator having an indicator path; and,
an indication receiver positioned within the housing, and located adjacent the indicator and the indicator path, for generating a signal that is representative of the position of the indicator and the position of the actuator.

16. The solenoid of claim 15 further comprising a collar attached to the actuator for movement therewith, within the central bore portion, wherein the indicator is moveably fitted with the collar for cooperating with the actuator for relative movement with the actuator.

17. The solenoid of claim 16, further comprising a biasing member cooperating with the actuator for biasing the actuator in a direction along the central axis.

18. The solenoid of claim 17, wherein the biasing member contacts the collar for biasing the collar and the actuator in a direction along the central axis.

19. The solenoid of claim 16, wherein the collar has a lower lip.

20. The solenoid of claim 19, wherein the biasing member contacts the lower lip of the collar for biasing the collar and the actuator in a direction along the central axis.

21. The solenoid of claim 16, wherein the collar has a lower lip and an upper lip, and wherein the indicator is fitted with the collar between the lower lip and the upper lip.

22. The solenoid of claim 21, wherein the lower lip and the upper lip form a groove, wherein the indicator fits within the groove, and wherein when the collar rotates about the central axis, the indicator slides within the groove.

23. The solenoid of claim 22, wherein the housing has a channel having a channel length that is generally parallel with the central axis and the indication path, the housing having an aperture along at least a part of the channel length between the channel and the central bore.

24. The solenoid of claim 23, wherein the indicator has a main portion which is moveably attached to the housing within the channel, a protrusion extending from the main portion through the aperture into the central bore portion and into the groove, and an arm extending from the main portion toward and contacting the indication receiver.

25. The solenoid of claim 23, wherein the groove creates a groove plane which is generally perpendicular to the central axis.

26. The solenoid of claim 15, wherein the indicator path is generally parallel to the central axis.

27. The solenoid of claim 15, wherein the indication receiver is mounted within the housing adjacent a channel within the housing, the channels allowing the indicator to move within the channel in response to movement of the actuator.

28. The solenoid of claim 15, wherein the indicator contacts the indication receiver to generate a signal that is representative of the position of the indicator along the indicator path, and that is representative of the position of the actuator.

29. A method of manufacturing a solenoid having a housing with a recess, the solenoid having an actuator, the solenoid having an indicator having an indicator path and being operatively connected to the actuator for movement therewith, and the solenoid having an indication receiver located adjacent the indicator and the indicator path for generating a signal that is representative of the position of the indicator and the position of the actuator, the method comprising the steps of:
aligning the indication receiver within the recess; and,
temporarily holding the indication receiver in place with positioning means.

30. The method of claim 29 further comprising the step of calibrating the signal that is representative of the position of the actuator with the actual position of the actuator.

31. The method of claim 30 wherein the step of calibrating the signal includes determining if the indication receiver needs to be repositioned.

32. The method of claim 31 wherein the positioning means does not need to be removed to reposition the indication receiver.

33. The method of claim 30 further comprising the step of permanently locking the indication receiver in place with locking means.

34. The method of claim 33 wherein the step of permanently locking the indication receiver in place includes filling at least a portion of the recess with a compound which hardens after filling.

35. The method of claim 33, wherein the locking means is a liquid compound which is placed into the recess, and which hardens after placement to lock the indication receiver in place.

36. The method of claim 29, wherein the positioning means includes at least one ring which biases the indication receiver into a fixed position.

* * * * *